(12) United States Patent
Hada (10) Patent No.: US 11,336,822 B2
(45) Date of Patent: May 17, 2022

(54) IMAGE PROCESSING DEVICE (71) Applicants: KABUSHIKI KAISHA TOSHIBA, Tokyo (JP); TOSHIBA ELECTRONIC DEVICES & STORAGE CORPORATION, Tokyo (JP)

(72) Inventor: Ryuji Hada, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 169 days.

(21) Appl. No.: 16/782,668

(22) Filed: Feb. 5, 2020

(65) Prior Publication Data
US 2021/0067688 A1 Mar. 4, 2021

(30) Foreign Application Priority Data
Aug. 29, 2019 (JP) ............................. JP2019-156589

(51) Int. Cl.
H04N 5/91 (2006.01)
H04N 5/232 (2006.01)
H04N 5/247 (2006.01)
G06T 5/00 (2006.01)
H04N 5/06 (2006.01)

(52) U.S. Cl.
CPC ......... *H04N 5/23229* (2013.01); *G06T 5/006* (2013.01); *H04N 5/06* (2013.01); *H04N 5/247* (2013.01); *H04N 5/91* (2013.01)

(58) Field of Classification Search
None
See application file for complete search history.

(56) References Cited

U.S. PATENT DOCUMENTS

| 7,027,085 B2 | 4/2006 | Watanabe |
| 7,969,473 B2 | 6/2011 | Kotoda |
| 2009/0103125 A1* | 4/2009 | Awata ..................... H04N 19/44 358/1.15 |
| 2010/0079622 A1* | 4/2010 | Kasahara ............... H04N 5/243 348/231.99 |
| 2018/0220117 A1 | 8/2018 | Hada et al. |
| 2019/0313026 A1* | 10/2019 | Cheng ....................... G06T 1/20 |

FOREIGN PATENT DOCUMENTS

| JP | 2003-158659 A | 5/2003 |
| JP | 2007-208781 A | 8/2007 |
| JP | 5930276 B2 | 6/2016 |

* cited by examiner

*Primary Examiner* — Eileen M Adams
(74) *Attorney, Agent, or Firm* — Foley & Lardner LLP (57) ABSTRACT

According to one embodiment, an image processing device includes buffer circuitry, calculation circuitry, and control circuitry. The buffer circuitry includes n buffer circuits corresponding to each of n cameras, and stores pixel data sequentially output from each of the n cameras. The calculation circuitry reads, as line image data, a pixel data group for one line which is stored in one buffer circuit, and generates frame image data using data obtained by performing image processing on the line image data. The control circuitry stores the pixel data from a certain camera in a certain buffer circuit, and selectively sets a read destination of the pixel data as a base of the line image data to any one of the buffer circuits in which the pixel data not subjected to the image processing is stored.

18 Claims, 5 Drawing Sheets

IMAGE PROCESSING DEVICE

CROSS-REFERENCE TO RELATED APPLICATION(S)

This application claims the benefit of and priority to Japanese Patent Application No. 2019-156589, filed Aug. 29, 2019, the entire contents of which are incorporated herein by reference.

FIELD

Embodiments described herein relate generally to an image processing device.

BACKGROUND

In related art, a system including a plurality of cameras, such as a drive assistance system and a monitoring camera system, is known.

In the system including the plurality of cameras, there is a problem that a scale of a circuit used for performing image processing such as development processing on data output from each of the plurality of cameras is increased according to the total quantity number of the cameras.

DETAILED DESCRIPTION

Embodiments provide an image processing device capable of preventing an increase in scale of a circuit used for performing image processing on data output from each of the plurality of cameras.

In general, according to one embodiment, an image processing device may be configured to generate frame image data corresponding to each of n (n≥2) cameras using pixel data obtained from each of the n cameras. The image processing device may include a buffer unit (e.g., buffer circuitry), a calculation unit (e.g., calculation circuitry), and a control unit (e.g., control circuitry, a controller). The buffer unit may include n buffer circuits corresponding to each of the n cameras, and store the pixel data sequentially output from each of the n cameras. The calculation unit may read, as line image data, a pixel data group for one line which is stored in one buffer circuit in the buffer unit, and generate the frame image data corresponding to one camera among the n cameras using data obtained by performing image processing on the line image data which is read. The control unit may perform a control for storing the pixel data output from a predetermined camera among the n cameras in a predetermined buffer circuit among the n buffer circuits, and perform a control for selectively setting a read destination of the pixel data as a base of the line image data to any one of the buffer circuits in which the pixel data not subjected to the image processing is stored.

Hereinafter, embodiments will be described with reference to the drawings.

First Embodiment

FIG. 1 to FIG. 4 are diagrams according to a first embodiment.

Figure 1:
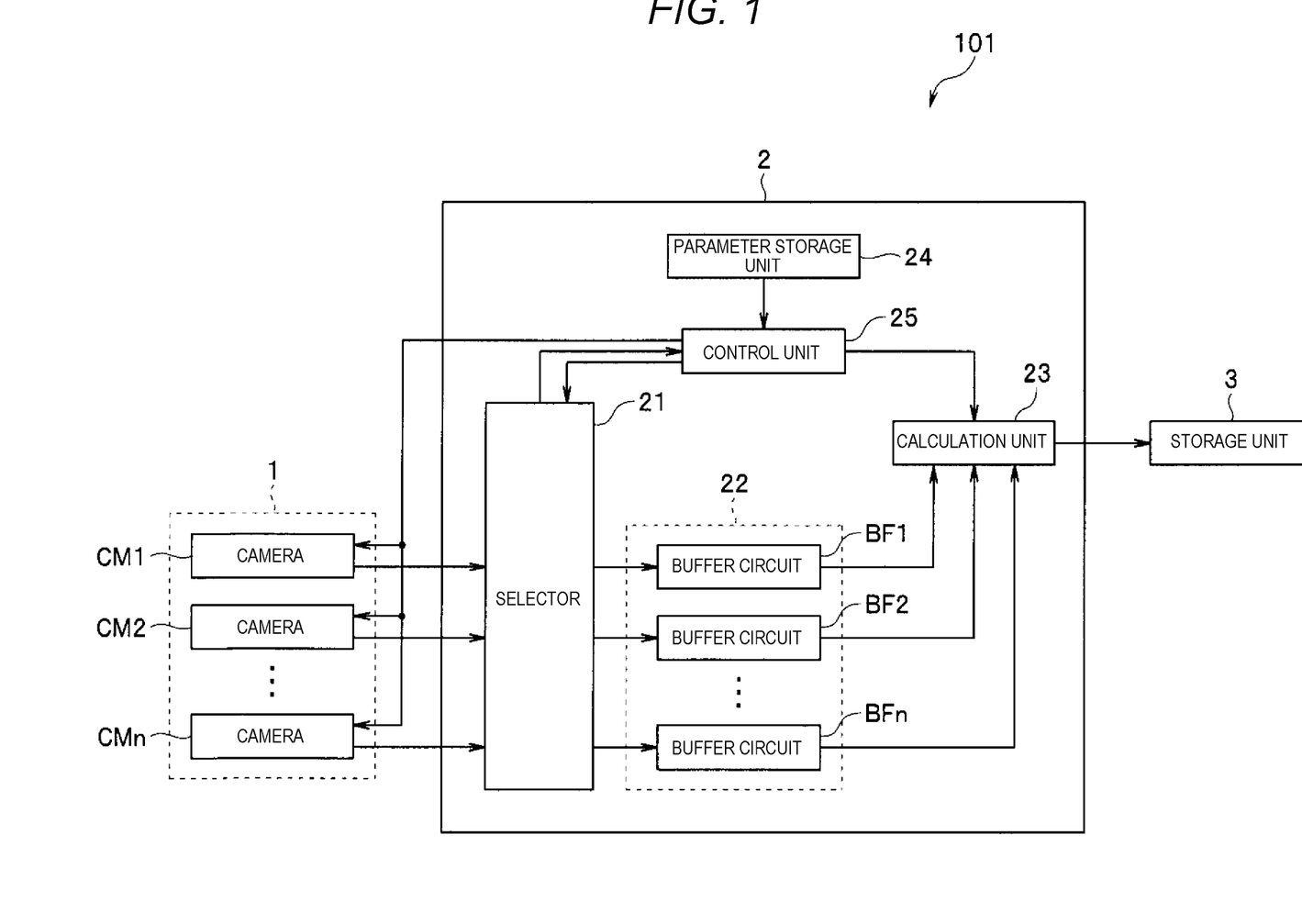
FIG. 1 is a diagram illustrating an example of a configuration of an image processing system including an image processing device according to a first embodiment.

As illustrated in FIG. 1, an image processing system 101 includes, for example, an imaging unit 1, an image processing device 2, and a storage unit 3. FIG. 1 is a diagram illustrating an example of a configuration of an image processing system including an image processing device according to the first embodiment.

The imaging unit 1 includes, for example, n (n≥2) cameras CM1, CM2, . . . , CMn having different view angles and/or different effective pixels.

Figure 2:
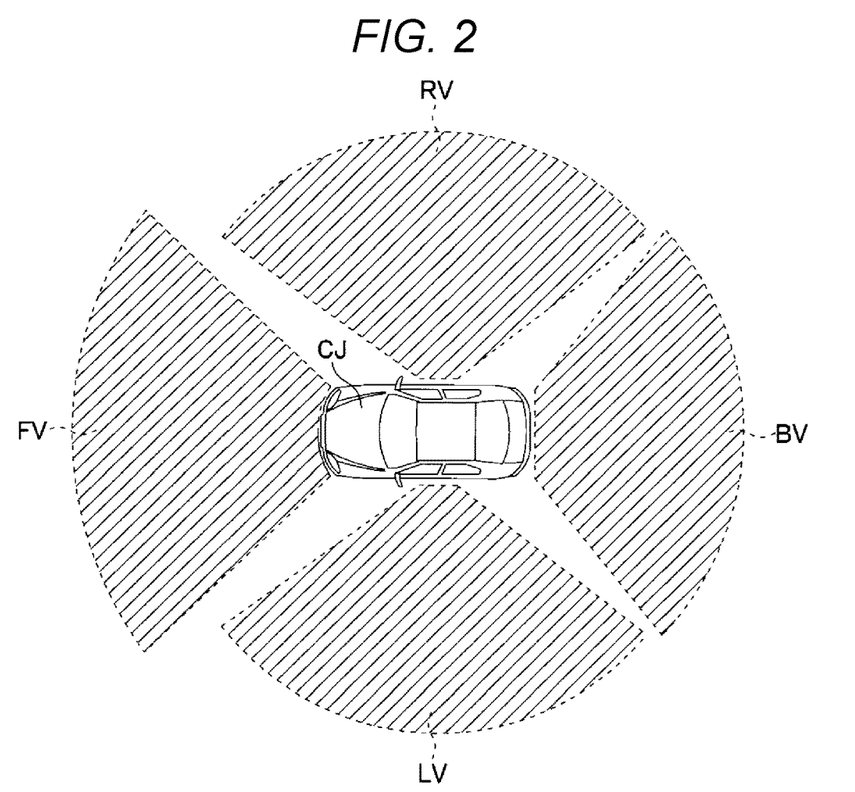
FIG. 2 is a diagram illustrating an example in which a plurality of cameras are provided in a vehicle.

Specifically, for example, when the image processing system 101 may be used to support driving of a vehicle CJ as illustrated in FIG. 2, the imaging unit 1 includes at least four cameras including a front camera having a view angle FV that captures an image of the front of the vehicle CJ, a back camera having a view angle BV that captures an image of the rear of the vehicle CJ, a left-side camera having a view angle LV that captures an image of the left side of the vehicle CJ, and a right-side camera having a view angle RV that captures an image of the right side of the vehicle CJ. FIG. 2 is a diagram illustrating an example in which a plurality of cameras are provided in a vehicle.

Each camera of the imaging unit 1 may include an image sensor such as a CMOS sensor. In addition, each camera of the imaging unit 1 may be configured to sequentially output pixel data to the image processing device 2, the pixel data being obtained in raster scan order from each of pixels arranged in a grid shape on the imaging surface of the image sensor. Further, each camera of the imaging unit 1 may be configured to output a horizontal synchronization signal to the image processing device 2, the horizontal synchronization signal indicating a timing of starting acquisition of the pixel data from a pixel group belonging to one line in the image sensor (e.g., a pixel group for one line in a horizontal direction).

Figure 3:
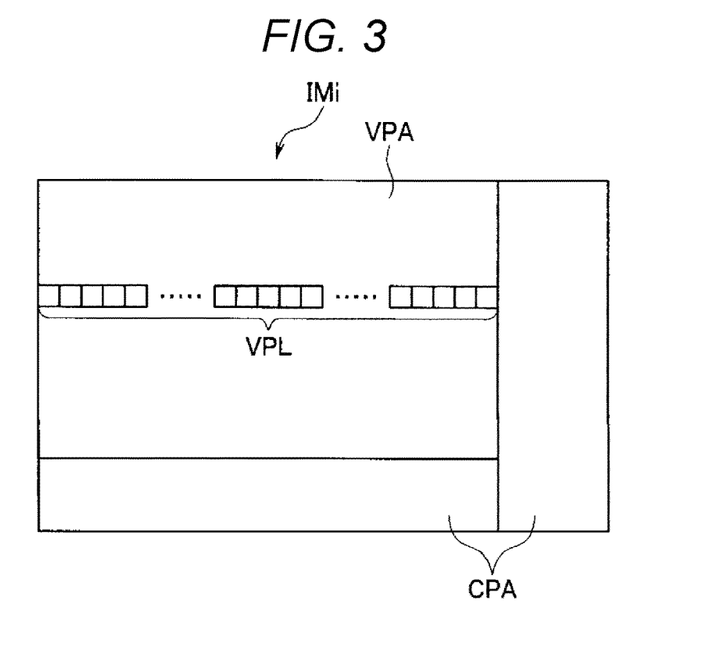
FIG. 3 is a diagram illustrating an example of a configuration of an image sensor provided in the camera.

Here, when it is assumed that one of n cameras in the imaging unit 1 is a camera CMi (i=1, 2, . . . , n), on the imaging surface of the image sensor IMi provided in the camera CMi, for example, as illustrated in FIG. 3, an effective pixel area VPA and a circuit area CPA disposed at a position adjacent to the effective pixel area VPA are provided, the effective pixel area VPA being an area including a pixel group from which the pixel data is to be acquired, and the circuit area CPA being an area including a circuit performing reading of the pixel data or the like. FIG. 3 is a diagram illustrating an example of the configuration of the image sensor provided in the camera.

The effective pixel area VPA includes an effective pixel group including pixels the number of which is obtained by multiplying an effective pixel number HSIZEi in a horizontal direction and the number of effective pixels VSIZEi in a vertical direction. Further, by scanning the effective pixel group VPL for one line in the horizontal direction one pixel by one pixel, the effective pixel group VPL being included in the effective pixel area VPA, a pixel data group as a base of line image data to be described can be obtained.

The image processing device 2 may be configured with, for example, an integrated circuit including one or more processors and a storage circuit. In addition, the image processing device 2 may be configured to store the pixel data output from the imaging unit 1 in raster scan order, generate frame image data (to be described) by performing image processing on the stored pixel data, and output the generated frame image data to the storage unit 3. In other words, the image processing device 2 may be configured to generate the frame image data corresponding to each of the n cameras by using the pixel data obtained in raster scan order from each pixel in the image sensor, which is provided in each of the n cameras of the imaging unit 1. Further, as illustrated in FIG. 1, the image processing device 2 includes, for example, a selector 21, a buffer unit 22 including n buffer circuits BF1, BF2, . . . , BFn corresponding to each of the n cameras in the imaging unit 1, a calculation unit 23, a parameter storage unit 24, and a control unit 25.

The selector 21 may be configured to perform an operation of writing the pixel data, which is output from the camera CMi in raster scan order, in a buffer circuit BFi corresponding to one of the n buffer circuits in the buffer unit 22 according to a control signal output from the control unit 25. Further, the selector 21 may be configured to transmit a horizontal synchronization signal output from each camera of the imaging unit 1 to the control unit 25.

The buffer unit 22 may be configured to store the pixel data sequentially output from each of the n cameras in the imaging unit 1.

Each buffer circuit of the buffer unit 22 may include, for example, an SRAM. Further, each buffer circuit of the buffer unit 22 may be configured as a circuit including an input line buffer and an intermediate buffer.

The buffer circuit BFi of the buffer unit 22 may be configured to store the pixel data obtained by the camera CMi in time series. Further, the buffer circuit BFi of the buffer unit 22 has a buffer size BUF_REQi, which is set in advance according to the number of the effective pixels of the camera CMi, the processing contents of the image processing performed on the pixel data obtained by the camera CMi, and the like.

The buffer unit 22 may be configured such that the total buffer size of the n buffer circuits becomes a buffer size BUF_SUM calculated using the following equation (1).

$$BUF\_SUM = \sum_{i=1}^{n} \{(MAX\_HSIZE/HSIZEi) \times BUF\_REQi\} \quad (1)$$

In the equation (1), MAX_HSIZE represents the maximum number of pixels among the numbers of the effective pixels in the horizontal direction in each of the n cameras in the imaging unit 1. Further, in the equation (1), HSIZEi represents the number of the effective pixels in the horizontal direction in the camera CMi.

For this reason, for example, when the imaging unit 1 includes a camera CM1 including 4000 effective pixels in the horizontal direction and 2000 effective pixels in the vertical direction and a camera CM2 including 2000 effective pixels in the horizontal direction and 1000 effective pixels in the vertical direction, the buffer size of the buffer unit 22 may be set to a buffer size calculated by the following equation (2).

$$BUF\_SUM = BUF\_REQ1 + (4000/2000) \times BUF\_REQ2 \quad (2)$$
$$= BUF\_REQ1 + 2 \times BUF\_REQ2$$

The calculation unit 23 may include, for example, an arithmetic circuit. Further, the calculation unit 23 may be configured to read, as line image data, the pixel data group for one line, which is stored in the buffer circuit BFi in the buffer unit 22, and perform image processing on the line image data which is read, according to a control signal output from the control unit 25. The calculation unit 23 may be configured to generate frame image data corresponding to the camera CMi using the data obtained by the image processing, and output the generated frame image data to the storage unit 3. The frame image data may be generated as one image (an image for one frame) including the same number of pixels as the number of the effective pixels of the image sensor provided in the camera CMi.

In the present embodiment, the calculation unit 23 may be configured to perform at least two types of processing including development processing and distortion correction processing, as image processing. Further, in the present embodiment, the calculation unit 23 may be configured to perform, for example, at least one of color correction processing and gamma correction processing, as image processing, in addition to the two types of processing.

The calculation unit 23 may be configured to operate at an operation frequency which is set in advance according to the image size of the frame image data, and the like. Specifically, the calculation unit 23 may be configured to operate at an operation frequency equal to or higher than a frequency ISP_FREQ calculated by using the following equation (3).

$$ISP\_FREQ = MAX\_HSIZE \times n \times MAX\_VSIZE \times FPS \quad (3)$$

In the equation (3), MAX_VSIZE represents the maximum number of pixels among the numbers of the effective pixels of each of the n cameras in the imaging unit 1 in the vertical direction. Further, in the equation (3), FPS represents a frame rate related to output of the frame image data from the calculation unit 23 to the storage unit 3.

Therefore, according to the equation (3), for example, when the imaging unit 1 includes a camera CM1 including 4000 effective pixels in the horizontal direction and 2000 effective pixels in the vertical direction and a camera CM2 including 2000 effective pixels in the horizontal direction and 1000 effective pixels in the vertical direction, the operation frequency of the calculation unit 23 may be set to a frequency equal to or higher than 640 MHz.

Further, according to the equation (3), for example, when the imaging unit 1 includes a camera CM1 including 4000 effective pixels in the horizontal direction and 2000 effective pixels in the vertical direction, a camera CM2 including 2000 effective pixels in the horizontal direction and 1000 effective pixels in the vertical direction, and a camera CM3 including 1000 effective pixels in the horizontal direction and 700 effective pixels in the vertical direction, the operation frequency of the calculation unit 23 may be set to a frequency equal to or higher than 720 MHz.

The parameter storage unit 24 may include, for example, a register circuit. Further, the parameter storage unit 24 stores parameters to be used in operations of the calculation unit 23 and the control unit 25. Specifically, the parameter storage unit 24 may store, for example, the image size of the frame image data corresponding to each of the n cameras in the imaging unit 1, and parameters such as a correction amount for distortion correction corresponding to each of the n cameras.

The control unit 25 may include, for example, a control circuit. In addition, the control unit 25 may be configured to generate a control signal for storing the pixel data output from the camera CMi in the buffer circuit BFi based on the horizontal synchronization signal output via the selector 21, and output the generated control signal to the selector 21. Further, the control unit 25 may be configured to generate a control signal for controlling a start timing of the image processing, the processing contents of the image processing, and the like based on the horizontal synchronization signal output via the selector 21 and the parameter read from the parameter storage unit 24, and output the generated control signal to the calculation unit 23. Further, the control unit 25 may be configured to generate a frame synchronization signal for aligning a timing of starting scanning of the pixel group for one line in the image sensor, and output the generated frame synchronization signal to each camera of the imaging unit 1.

The storage unit 3 may include, for example, a DRAM. Further, the storage unit 3 may be configured to sequentially store the frame image data output from the image processing device 2 (e.g., calculation unit 23).

Next, an effect according to the present embodiment will be described. In the following description, a case where the imaging unit 1 includes two cameras of a camera CM1 including 4000 effective pixels in the horizontal direction and 2000 effective pixels in the vertical direction and a camera CM2 including 2000 effective pixels in the horizontal direction and 1000 effective pixels in the vertical direction will be described as an example. Further, in the following description, it is assumed that the buffer unit 22 includes two buffer circuits of a buffer circuit BF1 of which the buffer size is set to BUF_REQ1 and a buffer circuit BF2 of which the buffer size is set to 2×BUF_REQ2 and that the operation frequency of the calculation unit 23 is set to 640 MHz.

The control unit 25 may generate a control signal for writing the pixel data sequentially output from the camera CM1 in the buffer circuit BF1 based on the horizontal synchronization signal output from the camera CM1 via the selector 21, and output the control signal to the selector 21. Further, the control unit 25 may generate a control signal for writing the pixel data sequentially output from the camera CM2 in the buffer circuit BF2 based on the horizontal synchronization signal output from the camera CM2 via the selector 21, and output the control signal to the selector 21.

The control unit 25 may estimate a length of a data acquisition period of each of the n cameras in the imaging unit 1 based on the image size included in the parameter read from the parameter storage unit 24.

Specifically, the control unit 25 may estimate each of a data acquisition period LP1 of the camera CM1 and a data acquisition period LP2 of the camera CM2 based on the image size included in the parameter read from the parameter storage unit 24.

In the present embodiment, the data acquisition period is defined as, for example, a time required to obtain the pixel data from the pixel group for one line (e.g., the pixel group belonging to one line) in the horizontal direction in the image sensor. In the following description, for simplification of an explanation, it is assumed that the data acquisition period LP1 is estimated to be twice the data acquisition period LP2 in length.

The control unit 25 may specify a longest data acquisition period among the data acquisition periods of the cameras in the imaging unit 1, generate a control signal for controlling a start timing of the image processing, the processing contents of the image processing, and the like based on the specified data acquisition period and the horizontal synchronization signal output via the selector 21, and output the generated control signal to the calculation unit 23.

Figure 4:
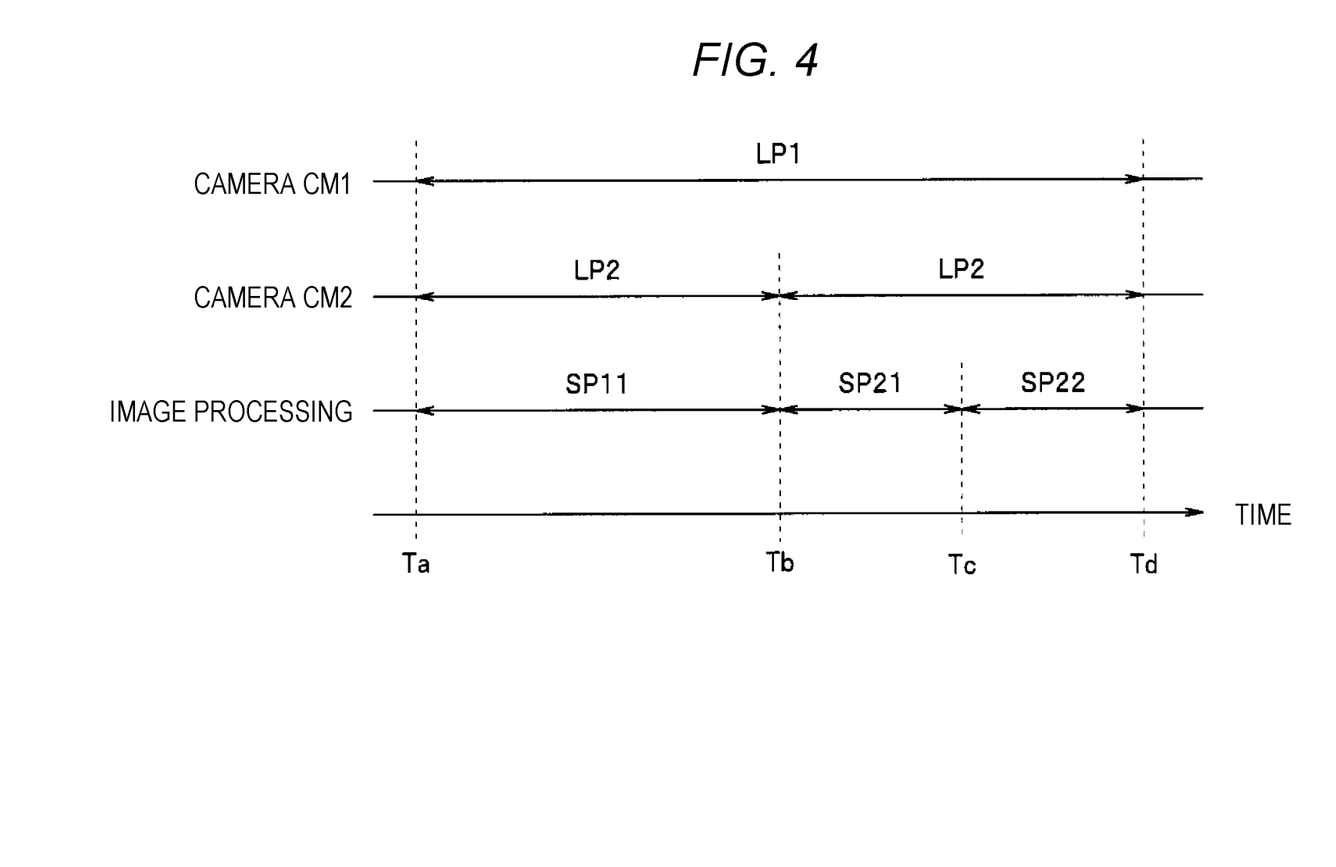
FIG. 4 is a diagram illustrating an example of specific operations of the image processing device according to the first embodiment.

Here, an example of specific operations performed in the calculation unit 23 and the control unit 25 according to the present embodiment will be described with reference to FIG. 4. In the following description, it is assumed that the pixel data group required for generation of the line image data corresponding to the pixel data output from the camera CM1 is stored in the buffer circuit BF1 in advance. Similarly, in the following description, it is assumed that the pixel data group required for generation of the line image data corresponding to the pixel data output from the camera CM2 is stored in the buffer circuit BF2 in advance. Further, in the following description, it is assumed that the data acquisition period LP1 is specified as the longest data acquisition period among the data acquisition periods of the cameras (CM1 and CM2) in the imaging unit 1. FIG. 4 is a diagram illustrating an example of specific operations of the image processing device according to the first embodiment.

At a time Ta (refer to FIG. 4) corresponding to a start timing of the data acquisition period LP1 of the camera CM1, the control unit 25 may generate a control signal for starting the image processing on the pixel data group stored in the buffer circuit BF1 based on the horizontal synchronization signal output from the camera CM1 via the selector 21, and output the control signal to the calculation unit 23. Further, at the time Ta, the control unit 25 may generate a control signal for performing distortion correction processing on the pixel data group stored in the buffer circuit BF1 using a correction amount CA1 included in the parameter read from the parameter storage unit 24, and output the control signal to the calculation unit 23.

At the time Ta, the calculation unit 23 may read, as line image data LG11, the pixel data group for one line, which includes 4000 pieces of pixel data stored in advance in the buffer circuit BF1 of the buffer unit 22, and start the image processing on the line image data LG11 which is read, according to the control signal output from the control unit 25. In a processing period SP11 (refer to FIG. 4) corresponding to a period from the time Ta to a time Tb, the calculation unit 23 may perform image processing on the line image data LG11 read from the buffer circuit BF1, the image processing including development processing and distortion correction processing using the correction amount CA1.

In a data acquisition period LP2 (refer to FIG. 4) corresponding to the period from the time Ta to the time Tb and overlapping with the processing period SP11, the control unit 25 may generate a control signal for writing the pixel data sequentially output from the camera CM2 in the buffer circuit BF2 based on the horizontal synchronization signal output from the camera CM2 via the selector 21, and output the control signal to the selector 21.

That is, according to the operation described above, in the processing period SP11, the image processing may be performed on the line image data LG11 for one line, which is read from the buffer circuit BF1, while the image processing is not performed on the pixel data group stored in the buffer circuit BF2. Therefore, in the present embodiment, by setting the buffer size of the buffer circuit BF2 to 2×BUF_REQ2, all the pieces of the pixel data sequentially output from the camera CM2 during the processing period SP11 can be written in the buffer circuit BF2.

The control unit 25 may acquire a progress status of the image processing on the line image data LG11 by monitoring an operation state of the calculation unit 23. At a time Tb (refer to FIG. 4) corresponding to a start timing of the data acquisition period LP2 of the camera CM2 and corresponding to an end timing of the processing period SP11, the control unit 25 may generate a control signal for starting first image processing on the pixel data group stored in the buffer circuit BF2, and output the control signal to the calculation unit 23. Further, at the time Tb, the control unit 25 may generate a control signal for performing distortion correction processing on the pixel data group stored in the buffer circuit BF2 using a correction amount CA2 (<CA1) included in the parameter read from the parameter storage unit 24, and output the control signal to the calculation unit 23.

At the time Tb, the calculation unit 23 may read, as line image data LG21, the pixel data group for one line, which includes 2000 pieces of pixel data stored in advance in the buffer circuit BF2 of the buffer unit 22, and start the image processing on the line image data LG21 which is read, according to the control signal output from the control unit 25. In a processing period SP21 (refer to FIG. 4) corresponding to a period from the time Tb to a time Tc, the calculation unit 23 may perform image processing on the line image data LG21 read from the buffer circuit BF2, the image processing including development processing and distortion correction processing using the correction amount CA2.

That is, according to the operation described above, in the processing period SP21, the image processing may be performed on the line image data LG21 for one line, which is read from the buffer circuit BF2, while the image processing is not performed on the pixel data group stored in the buffer circuit BF1.

The control unit 25 may acquire a progress status of the image processing on the line image data LG21 by monitoring an operation state of the calculation unit 23. At the time Tc (refer to FIG. 4) corresponding to an end timing of the processing period SP21, the control unit 25 may generate a control signal for starting second image processing on the pixel data group stored in the buffer circuit BF2, and output the control signal to the calculation unit 23. Further, at the time Tc, the control unit 25 may generate a control signal for performing distortion correction processing on the pixel data group stored in the buffer circuit BF2 using the correction amount CA2 included in the parameter read from the parameter storage unit 24, and output the control signal to the calculation unit 23.

At the time Tc, the calculation unit 23 may read, as line image data LG22, the pixel data group for one line, which includes 2000 pieces of pixel data stored in the buffer circuit BF2 of the buffer unit 22 and is adjacent to the line image data LG21, and start the image processing on the line image data LG22 which is read, according to the control signal output from the control unit 25. In a processing period SP22 (refer to FIG. 4) corresponding to a period from the time Tc to a time Td, the calculation unit 23 may perform image processing on the line image data LG22 read from the buffer circuit BF2, the image processing including development processing and distortion correction processing using the correction amount CA2.

That is, according to the operation described above, in the processing period SP22, the image processing may be performed on the line image data LG22 for one line, which is read from the buffer circuit BF2, while the image processing is not performed on the pixel data group stored in the buffer circuit BF1. In addition, according to the operation described above, in the data acquisition period LP1 (refer to FIG. 4) corresponding to the period from the time Ta to the time Td, the image processing may be performed on each of the line image data LG11 for one line which is read from the buffer circuit BF1, and pieces of the line image data LG21 and LG22 for two lines which are read from the buffer circuit BF2. Further, according to the operation described above, the control unit 25 may perform a control for selectively setting a read destination of the pixel data as a base of the line image data, to any one of the buffer circuits, which are provided in the buffer unit 22 and in which the pixel data not subjected to the image processing is stored. Furthermore, according to the operation described above, the control unit 25 may perform a control for switching a read destination of the pixel data as a base of the line image data, from the buffer circuit BF1 to the buffer circuit BF2 in the longest data acquisition period LP1 among the data acquisition periods of the n cameras in the imaging unit 1.

The present embodiment can also be applied to a case where the imaging unit 1 includes three or more cameras by appropriately modifying the configuration and/or the operation of each unit described above.

As described above, according to the present embodiment, the image processing may be performed on the pixel data output from each of the plurality of cameras in the imaging unit 1 in time division, and thus the line image data corresponding to each of the plurality of cameras can be generated. Further, according to the present embodiment, the buffer size of the buffer unit 22 and the operation frequency of the calculation unit 23 required for the image processing may be set according to specifications of each of the plurality of cameras in the imaging unit 1. Therefore, according to the present embodiment, it is possible to prevent an increase in scale of a circuit used for performing image processing on data output from each of the plurality of cameras.

Second Embodiment

Figure 5:
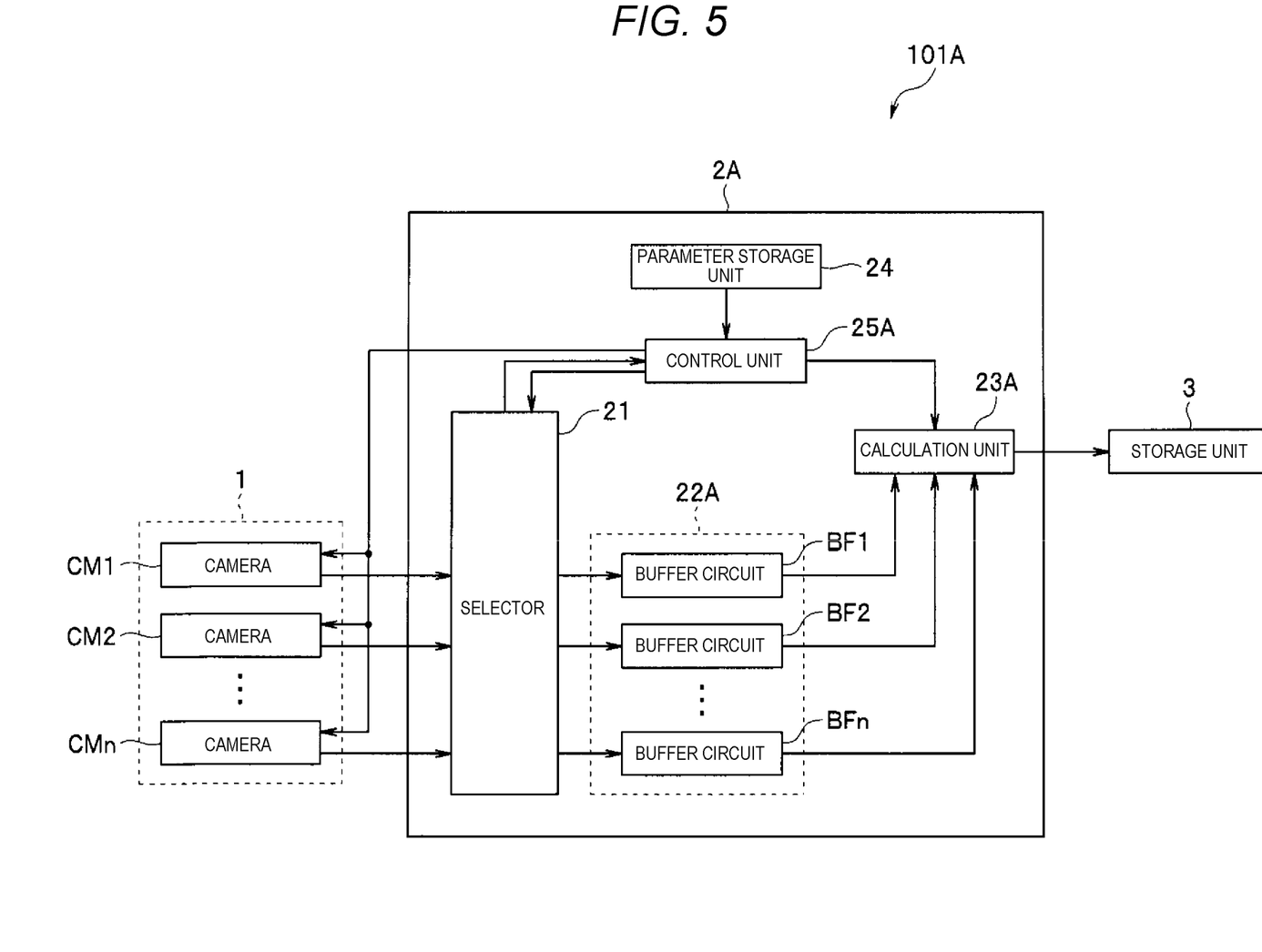
FIG. 5 is a diagram illustrating an example of a configuration of an image processing system including an image processing device according to a second embodiment.
Figure 6:
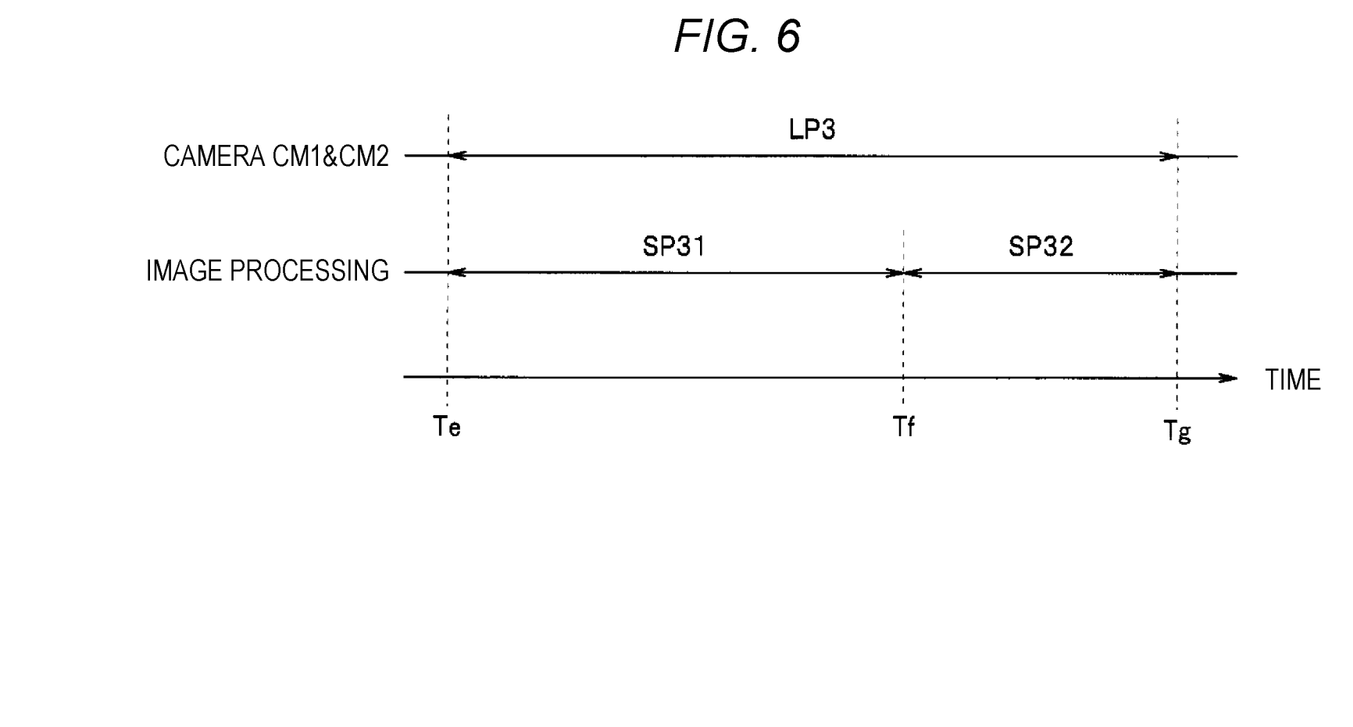
FIG. 6 is a diagram illustrating an example of specific operations of the image processing device according to the second embodiment.

FIG. 5 and FIG. 6 are diagrams according to a second embodiment.

In the present embodiment, a detailed description of a portion having the same configuration as that of the first embodiment will be omitted, and a portion having a configuration different from that of the first embodiment will be mainly described.

As illustrated in FIG. 5, an image processing system 101A includes, for example, an imaging unit 1, an image processing device 2A, and a storage unit 3. FIG. 5 is a diagram illustrating an example of a configuration of an image processing system including an image processing device according to the second embodiment.

The image processing device 2A may include, for example, one or more processors and a storage circuit. In addition, the image processing device 2A may be configured to store the pixel data sequentially output from the imaging unit 1, generate frame image data (to be described) by performing image processing on the stored pixel data, and output the generated frame image data to the storage unit 3. Further, as illustrated in FIG. 5, the image processing device 2A includes, for example, a selector 21, a buffer unit 22A including n buffer circuits BF1, BF2, . . . , BFn, a calculation unit 23A, a parameter storage unit 24, and a control unit 25A.

The buffer unit 22A may be configured such that the total buffer size of the n buffer circuits becomes a buffer size BUF_SUM calculated using the following equation (4).

$$BUF\_SUM = \sum_{i=1}^{n} BUF\_REQi \qquad (4)$$

According to the equation (4), for example, when the imaging unit 1 includes a camera CM1 including 4000 effective pixels in the horizontal direction and 2000 effective pixels in the vertical direction and a camera CM2 including 2000 effective pixels in the horizontal direction and 1000 effective pixels in the vertical direction, the buffer size of the buffer unit 22A may be set to BUF_REQ1+BUF_REQ2.

The calculation unit 23A may be configured to operate at an operation frequency which is set in advance according to the image size of the frame image data. Specifically, the calculation unit 23A may be configured to operate at an operation frequency equal to or higher than a frequency ISP_FREQ calculated by using the following equation (5).

$$ISP\_FREQ = \left(\sum_{i=1}^{n} HSIZEi\right) \times MAX\_VSIZE \times FPS \qquad (5)$$

According to the equation (5), for example, when the imaging unit 1 includes a camera CM1 including 4000 effective pixels in the horizontal direction and 2000 effective pixels in the vertical direction and a camera CM2 including 2000 effective pixels in the horizontal direction and 1000 effective pixels in the vertical direction, the operation frequency of the calculation unit 23A may be set to a frequency equal to or higher than 480 MHz.

The control unit 25A may be configured to generate a control signal for controlling writing of the pixel data output from each camera of the imaging unit 1 in the buffer unit 22A based on the horizontal synchronization signal output via the selector 21, and output the generated control signal to the selector 21. In addition, the control unit 25A may be configured to generate a control signal for controlling a start timing of the image processing, the processing contents of the image processing, and the like based on the horizontal synchronization signal output via the selector 21 and the parameter read from the parameter storage unit 24, and output the generated control signal to the calculation unit 23A. Further, the control unit 25A may be configured to generate a frame synchronization signal for aligning a timing of starting scanning of the pixel group of a first line in the image sensor, and output the generated frame synchronization signal to each camera of the imaging unit 1. Furthermore, the control unit 25A may be configured to generate a line synchronization signal corresponding to a synchronization signal for aligning a length of the data acquisition period of the image sensor to a certain length, and output the generated line synchronization signal to each of the n cameras in the imaging unit 1.

Next, an effect according to the present embodiment will be described. In the following description, a case where the imaging unit 1 includes two cameras of a camera CM1 including 4000 effective pixels in the horizontal direction and 2000 effective pixels in the vertical direction and a camera CM2 including 2000 effective pixels in the horizontal direction and 1000 effective pixels in the vertical direction will be described as an example. Further, in the following description, it is assumed that the buffer unit 22A includes two buffer circuits of a buffer circuit BF1 of which the buffer size is set to BUF_REQ1 and a buffer circuit BF2 of which the buffer size is set to BUF_REQ2 and that the operation frequency of the calculation unit 23A is set to 480 MHz.

The control unit 25A may generate a line synchronization signal for aligning a data acquisition period of the image sensor to a data acquisition period LP3, and output the generated line synchronization signal to each camera of the imaging unit 1. That is, according to the operation of the control unit 25A, a longest data acquisition period among data acquisition periods of the cameras (CM1 and CM2) in the imaging unit 1 may be the data acquisition period LP3.

The control unit 25A may generate a control signal for writing the pixel data sequentially output from the camera CM1 in the buffer circuit BF1 based on the horizontal synchronization signal output from the camera CM1 via the selector 21, and output the control signal to the selector 21. Further, the control unit 25A may generate a control signal for writing the pixel data sequentially output from the camera CM2 in the buffer circuit BF2 based on the horizontal synchronization signal output from the camera CM2 via the selector 21, and output the control signal to the selector 21.

The control unit 25A may generate a control signal for controlling a start timing of the image processing, the processing contents of the image processing, and the like based on the data acquisition period LP3 and the horizontal synchronization signal output via the selector 21, and output the generated control signal to the calculation unit 23.

Here, an example of specific operations performed in the calculation unit 23A and the control unit 25A according to the present embodiment will be described with reference to FIG. 6. In the following description, it is assumed that the pixel data group required for generation of the line image data corresponding to the pixel data output from the camera CM1 is stored in the buffer circuit BF1 in advance, and that the pixel data group required for generation of the line image data corresponding to the pixel data output from the camera CM2 is stored in the buffer circuit BF2 in advance. FIG. 6 is a diagram illustrating an example of specific operations of the image processing device according to the second embodiment.

At a time Te (refer to FIG. 6) corresponding to a start timing of the data acquisition period LP3, the control unit 25A may generate a control signal for starting the image processing on the pixel data group stored in the buffer circuit BF1 based on the horizontal synchronization signal output from the camera CM1 or the camera CM2 via the selector 21, and output the control signal to the calculation unit 23A. Further, at the time Te, the control unit 25A may generate a control signal for performing distortion correction processing on the pixel data group stored in the buffer circuit BF1 using the correction amount CA1 included in the parameter read from the parameter storage unit 24, and output the control signal to the calculation unit 23A.

At the time Te, the calculation unit 23A may read, as line image data LG31, the pixel data group for one line, which includes 4000 pieces of pixel data stored in advance in the buffer circuit BF1 of the buffer unit 22A, and start the image processing on the line image data LG31 which is read, according to the control signal output from the control unit 25A. In a processing period SP31 (refer to FIG. 6) corresponding to a period from the time Te to a time Tf, the calculation unit 23A may perform image processing on the line image data LG31 read from the buffer circuit BF1, the image processing including development processing and distortion correction processing using the correction amount CA1.

That is, according to the operation described above, in the processing period SP31, the image processing may be performed on the line image data LG31 for one line, which is read from the buffer circuit BF1, while the image processing is not performed on the pixel data group stored in the buffer circuit BF2.

The control unit 25A may acquire a progress status of the image processing on the line image data LG31 by monitoring an operation state of the calculation unit 23A. At the time Tf (refer to FIG. 6) corresponding to an end timing of the processing period SP31, the control unit 25A may generate a control signal for starting the image processing on the pixel data group stored in the buffer circuit BF2, and output the control signal to the calculation unit 23A. Further, at the time Tf, the control unit 25A may generate a control signal for performing distortion correction processing on the pixel data group stored in the buffer circuit BF2 using the correction amount CA2 included in the parameter read from the parameter storage unit 24, and output the control signal to the calculation unit 23A.

At the time Tf, the calculation unit 23A may read, as line image data LG32, the pixel data group for one line, which includes 2000 pieces of pixel data stored in advance in the buffer circuit BF2 of the buffer unit 22A, and start the image processing on the line image data LG32 which is read, according to the control signal output from the control unit 25A. In a processing period SP32 (refer to FIG. 6) corresponding to a period from the time Tf to a time Tg, the calculation unit 23A may perform image processing on the line image data LG32 read from the buffer circuit BF2, the image processing including development processing and distortion correction processing using the correction amount CA2.

That is, according to the operation described above, in the processing period SP32, the image processing may be performed on the line image data LG32 for one line, which is read from the buffer circuit BF2, while the image processing is not performed on the pixel data group stored in the buffer circuit BF1. In addition, according to the operation described above, in the data acquisition period LP3 (refer to FIG. 6) corresponding to the period from the time Te to the time Tg, the image processing may be performed on each of the line image data LG31 for one line which is read from the buffer circuit BF1 and the line image data LG32 for one line which is read from the buffer circuit BF2. Further, according to the operation described above, the control unit 25A may perform a control for selectively setting a read destination of the pixel data as a base of the line image data, to any one of the buffer circuits, which are provided in the buffer unit 22A and in which the pixel data not subjected to the image processing is stored. Furthermore, according to the operation described above, the control unit 25A may performs a control for switching a read destination of the pixel data as a base of the line image data, from the buffer circuit BF1 to the buffer circuit BF2 in the longest data acquisition period LP3 among the data acquisition periods of the n cameras in the imaging unit 1.

The present embodiment can also be applied to a case where the imaging unit 1 includes three or more cameras by appropriately modifying the configuration and/or the operation of each unit described above.

As described above, according to the present embodiment, the image processing may be performed on the pixel data output from each of the plurality of cameras in the imaging unit 1 in time division, and thus the line image data corresponding to each of the plurality of cameras can be generated. Further, according to the present embodiment, the buffer size of the buffer unit 22A and the operation frequency of the calculation unit 23A required for the image processing may be set according to specifications of each of the plurality of cameras in the imaging unit 1. Therefore, according to the present embodiment, it is possible to prevent an increase in scale of a circuit used for performing image processing on data output from each of the plurality of cameras.

While certain embodiments have been described, these embodiments have been presented byway of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image processing device configured to generate frame image data corresponding to each of a plurality of cameras using pixel data obtained from each of the plurality of cameras, the image processing device comprising:
   buffer circuitry that includes a plurality of buffer circuits corresponding to the plurality of cameras, each buffer circuit configured to store the pixel data sequentially output from a respective one of the plurality of cameras;
   calculation circuitry configured to read, as line image data, a pixel data group for one line which is stored in one buffer circuit in the buffer circuitry, and generate the frame image data corresponding to one camera among the plurality of cameras using data obtained by performing image processing on the line image data; and
   control circuitry configured to control storing the pixel data output from a camera among the plurality of cameras in a buffer circuit among the plurality of buffer circuits and control selectively setting a read destination of the pixel data as a base of the line image data to one of the buffer circuits in which the pixel data not subjected to the image processing is stored,
   wherein a time required to obtain the pixel data from a pixel group for one line in a horizontal direction in an image sensor provided in each of the plurality of cameras is a data acquisition period of such camera, and
   in a longest data acquisition period among data acquisition periods of the plurality of cameras, the control circuitry is configured to perform a control for switching the read destination of the pixel data as a base of the line image data to another buffer circuit in the buffer circuitry that is different from the one buffer circuit.

2. The image processing device according to claim 1, wherein the control circuitry is further configured to estimate a length of the data acquisition period of each of the plurality of cameras based on an image size of the frame image data corresponding to each of the plurality of cameras.

3. The image processing device according to claim 1, wherein the control circuitry is configured to generate a synchronization signal for aligning a length of the data acquisition period to a certain length and output the synchronization signal to each of the plurality of cameras.

4. The image processing device according to claim 1, wherein the calculation circuitry is configured to perform distortion correction processing as the image processing.

5. The image processing device according to claim 1, further comprising a selector configured to transmit a horizontal synchronization signal output from each camera to the control circuitry,
wherein the control circuitry is configured to output a control signal to the selector.

6. The image processing device according to claim 1, wherein the control circuitry is configured to generate a control signal for storing the pixel data output from the certain camera in the certain buffer circuit based on a horizontal synchronization signal output from the certain camera.

7. The image processing device according to claim 1, wherein the control circuitry is configured to generate a control signal for controlling a start timing of the image processing based on a horizontal synchronization signal output from the certain camera and a parameter read from a parameter storage.

8. The image processing device according to claim 1, wherein the control circuitry is configured to generate a control signal for starting the image processing on the pixel data group stored in the certain buffer circuit based on a horizontal synchronization signal output from the certain camera.

9. The image processing device according to claim 1, wherein the control circuitry is configured to generate a control signal for performing distortion correction processing on the pixel data group stored in the certain buffer circuit using a correction amount included in a parameter read from a parameter storage.

10. A method for generating frame image data corresponding to each of a plurality of cameras using pixel data obtained from each of the plurality of cameras, the method comprising:
storing, by each buffer circuit of a plurality of buffer circuits corresponding to the plurality of cameras, the pixel data sequentially output from a respective one of the plurality of cameras;
reading as line image data, by calculation circuitry, a pixel data group for one line which is stored in one buffer circuit in the buffer circuitry, and generating the frame image data corresponding to one camera among the plurality of cameras using data obtained by performing image processing on the line image data; and
controlling, by control circuitry, storing the pixel data output from a camera among the plurality of cameras in a buffer circuit among the plurality of buffer circuits and controlling selectively setting a read destination of the pixel data as a base of the line image data to one of the buffer circuits in which the pixel data not subjected to the image processing is stored,
wherein a time required to obtain the pixel data from a pixel group for one line in a horizontal direction in an image sensor provided in each of the plurality of cameras is a data acquisition period of such camera, and
the method further comprises
in a longest data acquisition period among data acquisition periods of the plurality of cameras, performing a control for switching the read destination of the pixel data as a base of the line image data to another buffer circuit in the buffer circuitry that is different from the one buffer circuit.

11. The method according to claim 10, further comprising:
estimating, by the control circuitry, a length of the data acquisition period of each of the plurality of cameras based on an image size of the frame image data corresponding to each of the plurality of cameras.

12. The method according to claim 10, further comprising:
generating, by the control circuitry, a synchronization signal for aligning a length of the data acquisition period to a certain length and outputting the synchronization signal to each of the plurality of cameras.

13. The method according to claim 10, further comprising:
performing, by the calculation circuitry, distortion correction processing as the image processing.

14. The method according to claim 10, further comprising:
transmitting, by a selector, a horizontal synchronization signal output from each camera to the control circuitry; and
outputting, by the control circuitry, a control signal to the selector.

15. The method according to claim 10, further comprising:
generating, by the control circuitry, a control signal for storing the pixel data output from the certain camera in the certain buffer circuit based on a horizontal synchronization signal output from the certain camera.

16. The method according to claim 10, further comprising:
generating, by the control circuitry, a control signal for controlling a start timing of the image processing based on a horizontal synchronization signal output from the certain camera and a parameter read from a parameter storage.

17. The method according to claim 10, further comprising:
generating, by the control circuitry, a control signal for starting the image processing on the pixel data group stored in the certain buffer circuit based on a horizontal synchronization signal output from the certain camera.

18. The method according to claim 10, further comprising:
generating, by the control circuitry, a control signal for performing distortion correction processing on the pixel data group stored in the certain buffer circuit using a correction amount included in a parameter read from a parameter storage.

* * * * *